March 2, 1943.   R. ANXIONNAZ ET AL   2,312,995
GAS TURBINE PLANT
Filed July 21, 1938

Inventors
R. Anxionnaz
R. Imbert
By Watson, Cole, Grindle, & Watson
Attorneys

Patented Mar. 2, 1943

2,312,995

UNITED STATES PATENT OFFICE 2,312,995

GAS TURBINE PLANT

René Anxionnaz, Paris, and Roger Imbert, Mantes, France; vested in the Alien Property Custodian Application July 21, 1938, Serial No. 220,590
In France August 4, 1937

3 Claims. (Cl. 253—16.5)

The present invention relates to gas turbine plants and its object is to provide improvements to said plants.

It is a known fact that, in order to obtain a good efficiency of a gas turbine the temperature before expansion should be as high as possible. It is also known that the peripheral speed of these turbines is limited by the stress imposed by the centrifugal force upon the blades turning in hot gases and that the expansion that can be utilized in the wheel with a good efficiency and therefore the corresponding drop of temperature are themselves limited by this peripheral speed.

The temperature in the wheel must not be too high in order that the mechanical resistance of the metal of the blades may remain sufficient. Consequently the temperature of admission of the gases into the turbine, which is equal to the temperature in the wheel, added to the drop of temperature corresponding to the expansion, is itself limited.

A first object of the present invention is to permit of raising the temperature of admission without increasing the temperature in the wheel or the peripheral speed, thus obtaining a higher efficiency.

According to an essential feature of the present invention, the expansion of the gases (or one stage of their expansion, in particular after a reheating) is divided into two partial expansions, and the first of these partial expansions, taking place before the wheel of a first turbine, is greater than that corresponding to the power necessary for driving said turbine, the energy that is not utilized for driving said first wheel, together with that corresponding to the second partial expansion, being utilized in a second wheel arranged in series with the first one and rotating preferably in the opposite direction. The first partial expansion takes place in a distributor or nozzles located before the first wheel and the second partial expansion takes place either in an intermediate distributor or nozzles or alternatively in the second wheel itself.

It will be readily understood that, for a given temperature in the first wheel, the temperature of admission can be increased since the drop of temperature corresponding to the expansion is more considerable. On the other hand, recuperation of the energy remaining at the outlet of the first wheel in the form of kinetic energy in the gases will be obtained with the minimum of losses in the case of inverted rotation and the total efficiency will be increased.

Other features of the present invention will be apparent from the following detailed description of some specific embodiments thereof.

Preferred embodiments of the present invention will be hereinafter described, with reference to the accompanying drawing, given merely by way of example, and in which.

Figure 4:
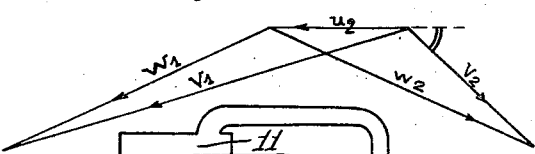
Figure 5:
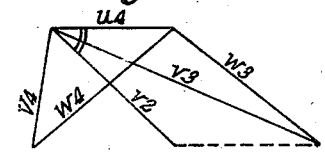
Figure 6:
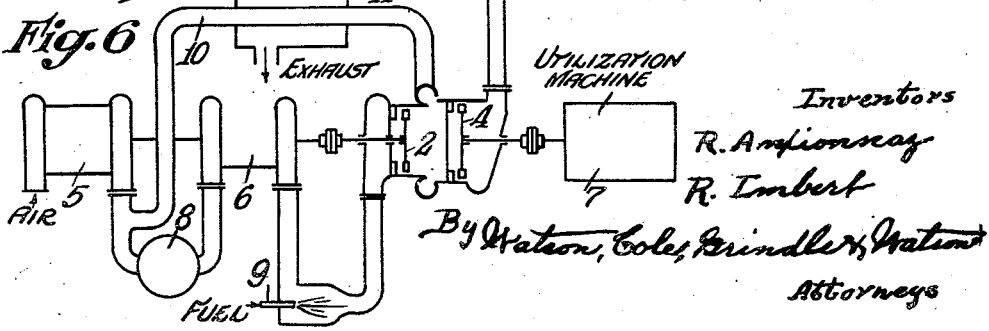

Figs. 4 and 5 are diagrams showing the various velocities of the fluid and wheels, to wit: when the fluid enters the first wheel ($u_2$, $v_1$, $w_1$); when leaving the first wheel ($u_2$, $v_2$, $w_2$); when entering the second wheel ($u_4$, $v_3$, $w_3$); and when leaving the second wheel ($u_4$, $v_4$, $w_4$); in these figures, letters $u$ designate the periperal velocity of the wheels, $v$ the absolute velocity of the fluid, and $w$ its relative velocity;

Fig. 6 diagrammatically shows the arrangement of a system of turbines according to the invention, with the air compressors and the utilization machines.

Figure 1:
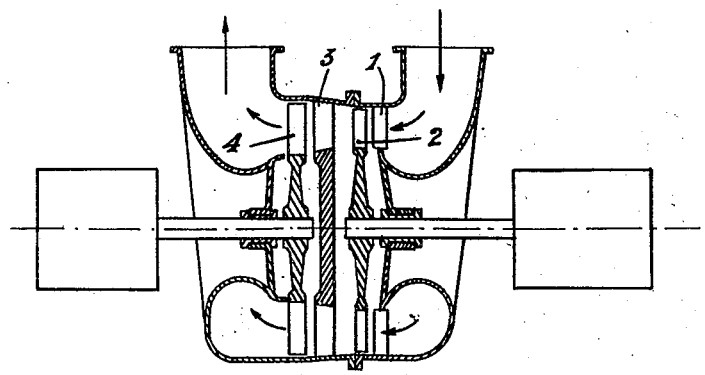
Fig. 1 is a diagrammatic axial sectional view of a system of turbines made according to the present invention.
Figure 2:
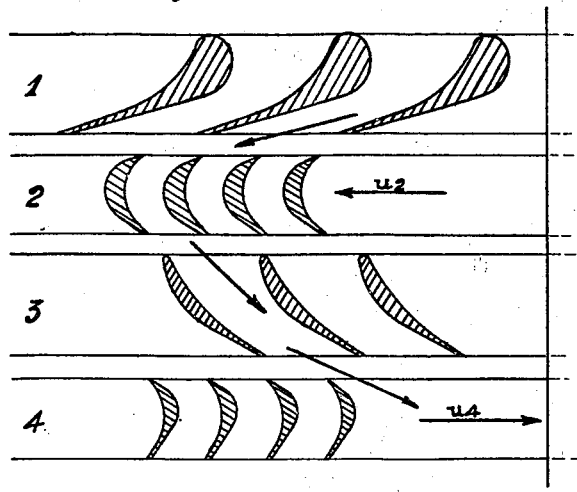
Fig. 2 is a partial developed view diagrammatically showing the blade systems of the two wheels and of the nozzles.

In Figs. 1 and 2, reference characters 2 and 4 show the turbine wheels and 1 and 3 the stationary systems of blades or nozzles.

The motive gases compressed at a pressure equal to $p$ (Fig. 3) enter the nozzles 1, flows through said nozzles, the first turbine wheel 2, the stationary guide blades 3 and the second turbine wheel 4. At their exit of this second wheel, the pressure of the said gases is $p''$ much lower than the initial pressure $p$ and the difference of the pressures $p$ and $p''$ (total expansion of the gases) corresponds to the mechanical power available on the shafts of the wheels 2 and 4.

Figure 3:
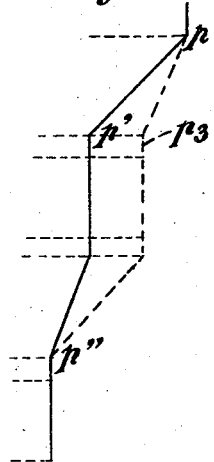
Fig. 3 is a diagram showing the successive expansions of the motive gases which occur, the one in the discharging nozzles mounted ahead of the first turbine wheel and the other in the stationary blades arranged between the first and the second turbine wheel.

In the nozzles 1 the gases are first expanded down to an intermediate pressure $p'$ lower than $p$ but greater than $p''$ (Fig. 3) and according to one feature of our invention, this first step of expansion from $p$ down to $p'$ is greater than that corresponding to the power of the first wheel 2. (The dotted lines in Fig. 3 shows the intermediate pressure $p_3$ which corresponds to a first step of expansion from $p$ down to $p_3$ equal to the power of the first wheel.)

The gases which enter wheel 2 with a velocity $v_1$ (Fig. 4) therefore retain, when leaving this wheel, a relatively considerable amount of energy in the kinetic form. It follows that their velocity $v_2$ when leaving wheel 2 is high and has a tangential component which is relatively important (Fig. 4), this component being opposed in direction to the rotary velocity of the wheel. This remaining velocity is utilized in wheel 4 at the same time as the energy corresponding to the second portion of the expansion, from the intermediate pressure $p'$ down to the exhaust pressure $p''$.

The stationary guide blades 3, through which flow the gases at their exit of the first turbine wheel 2 are adapted to deviate the velocity of these gases in the suitable direction with respect to the second wheel and, at the same time, to cause the second portion of the expansion from the intermediate pressure $p'$ down to the final exhaust pressure $p''$, so that an absolute velocity $v_3$ (Fig. 5) higher than $v_2$ and suitably directed is given to the gases at their entrance into the wheel 4.

The velocity of the wheel 4 being $u_4$, the relative velocity of the gases at their entrance into the wheel 4 is $w_3$. The gases work in the wheel 4 and they have at their exit of this wheel an absolute velocity $v_4$ much lower than $v_3$ and the direction of which is approximately axial.

Wheel 4, same as wheel 2, in the example that is considered, is an impulse wheel.

We might cause wheel 4 to turn in the same direction as wheel 2, but, in this case the deviation of velocity $v_2$ to be obtained in the intermediate nozzles would be very large in order to direct the gases in the new direction of rotation (averaging 140 or 150° for instance) and, consequently, this deviation would involve rather high losses due to friction, eddies, and so on. Consequently, it is more advantageous to cause wheel 4 to turn in a direction opposed to the direction in which wheel 2 is rotating. With this arrangement, the deviation to be obtained in the intermediate nozzles is very small (a few degrees) and it is even possible to make it negligible.

We may also produce the final partial expansion, from the intermediate pressure $p'$ down to the exhaust pressure $p''$, either wholly or partly in wheel 4 which is then partly a reaction wheel.

If the whole of this last mentioned partial expansion takes place in wheel 4, it is possible to dispense with the intermediate system of stationary blades 3, by suitably tracing the blades of wheel 2 and giving this last mentioned wheel a velocity such that the direction of the gases when leaving wheel 2 is substantially that which is suitable for entering wheel 4.

Of course, in any practical device, as opposed to the theoretical ideal machine, there would be losses of both potential pressure energy and kinetic energy of motion of the gases, whereby certain inconsiderable quantities of energy of both types might be transmitted through either or both stages of a turbine system, but the division of energy positively and purposely made in the present case is considerably more than such inadvertent transfers of unused energy. With this thought in view, it is realized that, in practice, probably no turbine wheel may be designated as a pure impulse wheel or a pure reaction wheel, and these designations are employed in the present case to indicate the overwhelming predominance of action and function of the wheels thus designated.

Owing to this arrangement, it will be readily understood that, the heat drop before wheel 2 being more important than that corresponding to the energy utilized in this wheel, the temperature at the inlet of nozzles 1 can be substantially higher than it would be in an ordinary turbine for a same temperature in the wheel. At the same time, owing to the recuperation, the efficiency of the wheel is, for a given ratio $u/v$, considerably higher than in a normal turbine having a single stage of expansion. The advantages in the case of a gas turbine are obvious: for a given fatigue of the blades of the wheel, that is to say for a given peripheral speed and a given temperature of the gases in the wheel, it is possible to have a higher temperature of admission, and therefore an improved cycle efficiency, while the efficiency of the turbine itself is improved.

Inversely, it is possible, for a given temperature of admission and given efficiency of the cycle, considerably to reduce the peripheral speed of the turbine and also the temperature in the blades, which permits of reducing the fatigue of said blades down to an admissible value.

These advantages are particularly considerable if the power to be supplied by the first wheel is higher than that to be delivered by the second wheel, which is the case with the actual efficiencies of turbines, when the first wheel drives the compressors necessary for feeding the turbines and the second wheel drives the utilization machine. However, this arrangement is not the only possible one and we would not depart from the principle of the present invention by changing the functions of the wheels or causing them to drive any kind of machine.

The system of turbines which has just been described can of course be combined with other gas turbines and other turbine wheels of any type whatever.

In order to maintain the efficiency at the highest possible value when the load varies, it is necessary to keep the temperature of the gases in the wheel always to the highest possible value that is compatible with the good operation and preservation of the turbine. It is therefore necessary, in order to vary the power supplied by the turbines, to vary the pressure of admission of the gases. But it is known that in a two wheel turbine, when the pressure of admission varies, the power supplied by the second wheel, or rear wheel varies much more rapidly than that supplied by the front wheel. As, in a turbine according to the present invention, the two wheels may drive two different machines, it is necessary to be able to bring back the ratio of the powers they supply to the given value. On the other hand, if the compressor or compressors which feed motive fluid to the turbines are keyed on the same shaft or are driven by machines turning at substantially equal speeds, when, for instance, the ratio of compression they have to supply decreases, the volume of air flowing through the low pressure stages becomes too small and that passing through the high pressure stages becomes too great with respect to the volumes for which the respective stages are adapted.

In the U. S. A. patent application Ser. No. 186,747 filed on January 24, 1938, for improvements in "Gas turbine engine plants," we have described a device for obviating these drawbacks, which consists in connecting through a balancing conduit the intermediate space between two turbines connected in series with a stage of compression where the pressure is equivalent.

Fig. 6 shows an example of application of this device to a system of turbines according to the above described principle of the present invention, this application involving certain particular features which will now be explained.

Reference characters 2 and 4 designate the two wheels of the system.

Wheel 2 drives the two compressors 5 and 6, connected together in series, whereas wheel 4 is coupled to the utilization machine 7. The first compressor 5 (low pressure compressor) takes air from the atmosphere and discharges it into compressor 6, eventually after its passage through an intermediate cooling device 8. When leaving compressor 6, the air is heated for instance by internal combustion of a liquid fuel, by means of a burner 9.

The intermediate stage between the two turbines is connected to the discharge end of the first compressor 5 through the balancing conduit 10, which may be provided with a gas heating device.

In the example illustrated by the drawing, this balancing conduit passes through the heat recuperator 11, through which the exhaust gases flow in the opposite direction.

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the appended claims.

What we claim is:

1. A gas turbine system for utilizing the energy of a motive gas under pressure, which comprises, in combination, a primary turbine unit and a secondary turbine unit arranged in series and respectively including a primary turbine wheel and a secondary turbine wheel, said secondary wheel disposed coaxially with but mechanically independent of said primary wheel and oppositely rotated, the blades of said primary wheel being those of an impulse wheel, gas discharging nozzles disposed in advance of said primary wheel and constructed and arranged to expand said gases to an extent necessary to transform a part only of the pressure of said gases into kinetic energy, said part, however, being in excess of that which is converted into work by the primary wheel, said excess being considerably more than in the normal operation of the impulse stage of a conventional turbine system, said secondary turbine wheel disposed so as to receive the motive gases which are discharged from the primary wheel, said secondary turbine unit being so constructed and arranged as to utilize both the excess of kinetic energy and the remaining pressure energy of the gases.

2. A gas turbine system for utilizing the energy of a motive gas under pressure, which comprises, in combination, a primary turbine unit and a second turbine unit arranged in series and respectively including a primary turbine wheel and a secondary turbine wheel, said secondary wheel disposed coaxially with but mechanically independent of said primary wheel and oppositely rotated, the blades of said primary wheel being those of an impulse wheel, gas discharging nozzles disposed in advance of said primary wheel and constructed and arranged to expand said gases to an extent necessary to transform a part only of the pressure of said gases into kinetic energy, said part, however, being in excess of that which is converted into work by the primary wheel, said excess being considerably more than in the normal operation of the impulse stage of a conventional turbine system, said secondary unit including stationary guide blades for receiving the motive gases discharged from the primary wheel and delivering them to the secondary wheel, said blades being so constructed and arranged as to convert the remaining pressure energy of the gases to kinetic energy and to transmit this kinetic energy together with the excess kinetic energy remaining in the gases, upon their exit from the primary wheel, to said secondary turbine wheel, said second wheel being of the construction of an impulse wheel.

3. A gas turbine system for utilizing the energy of a motive gas under pressure, which comprises, in combination, a primary turbine unit and a secondary turbine unit arranged in series and respectively including a primary turbine wheel and a secondary turbine wheel, said secondary wheel disposed coaxially with but mechanically independent of said primary wheel and oppositely rotated, the blades of said primary wheel being those of an impulse wheel, gas discharging nozzles disposed in advance of said primary wheel and constructed and arranged to expand said gases to an extent necessary to transform a part only of the pressure of said gases into kinetic energy, said part, however, being in excess of that which is converted into work by the primary wheel, said excess being considerably more than in the normal operation of the impulse stage of a conventional turbine system, said secondary turbine wheel disposed so as to directly receive the motive gases from the primary wheel, said secondary turbine wheel being of the combined impulse and reaction type constructed and arranged to utilize the excess kinetic energy in the gases upon their exit from the primary wheel and also to utilize the pressure energy remaining in the gases, by expansion thereof in said secondary wheel.

RENÉ ANXIONNAZ.
ROGER IMBERT.